United States Patent Office 3,485,893
Patented Dec. 23, 1969

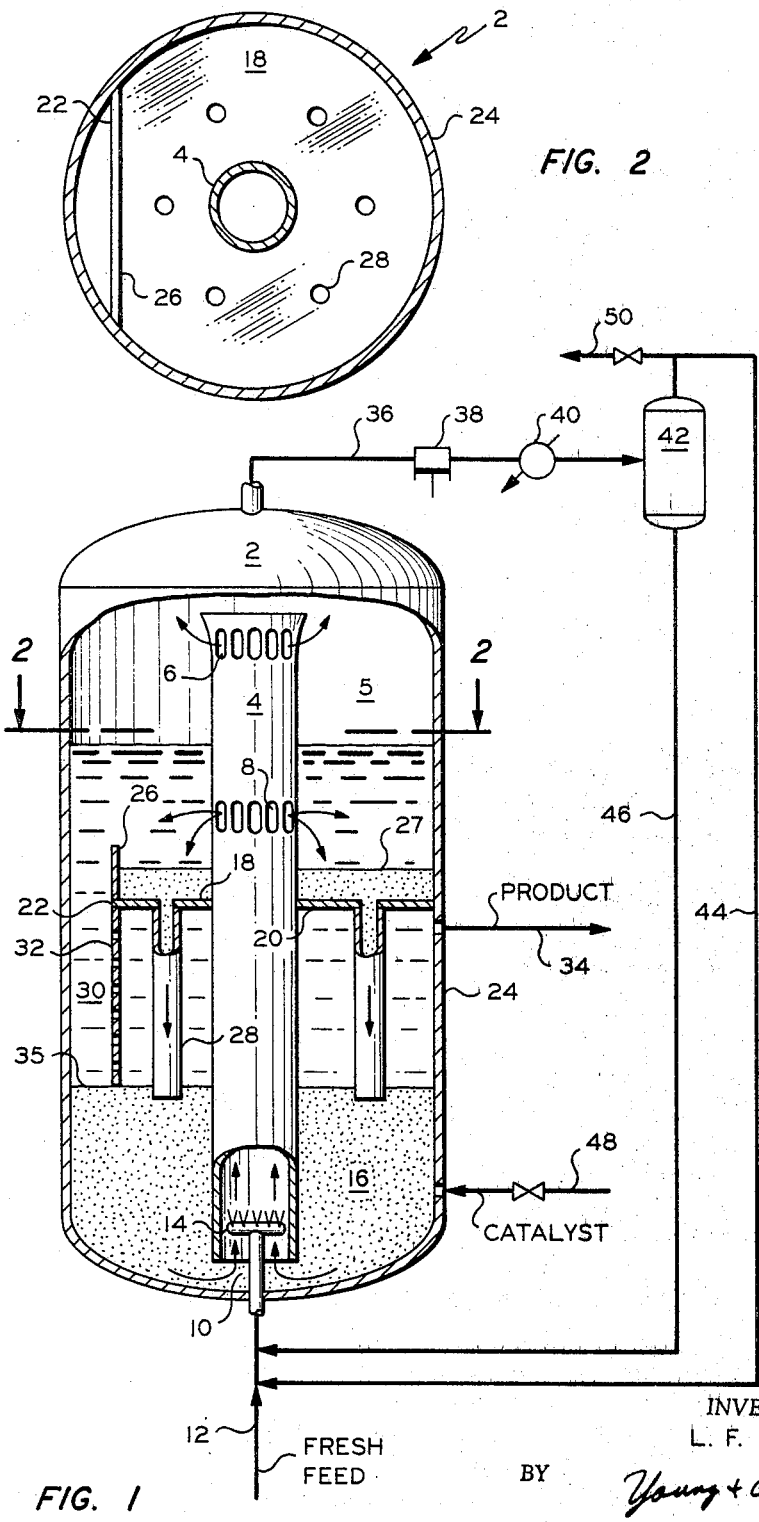

3,485,893
ALKYLATION PROCESS AND VESSEL COMBINING REACTION, CATALYST SEPARATION AND COALESCENCE THEREIN
Luther F. Mayhue, Bartlesville, Okla., assignor to Phillips Petroleum Company, a corporation of Delaware
Filed June 9, 1967, Ser. No. 644,889
Int. Cl. C07c 5/00
U.S. Cl. 260—683.43
9 Claims

ABSTRACT OF THE DISCLOSURE

In an alkylation system, for instance for producing diisopropyl from isobutane and ethylene using an aluminum halide catalyst, a single alkylation vessel or zone is provided which serves as a reaction zone, separation zone, and coalescence zone. This vessel has a central riser leg with means at the bottom to introduce the reactants, and openings to allow catalyst to be drawn up into the riser; at the upper portion of this riser are openings, generally in two sets, the upper set serving to allow vapor to flow out into the upper portion of the vessel, and the lower set serving to allow the liquid catalyst-product emulsion to flow out onto a tray which is positioned just below this second set of apertures. This tray has at least one downcomer which carries the heavier liquid catalyst down to the catalyst phase at the lower portion of the vessel. This tray is truncated along one side and has a dam member to allow the lighter hydrocarbon product to overflow; extending downward from this truncated section is a perforated baffle which allows the hydrocarbon product to flow laterally across the vessel above the catalyst phase to a product recovery line.

---

This invention relates to an improved alkylation process using aluminum halide catalyst. In another aspect it relates to an improved alkylation system comprising an alkylation vessel which serves as a combination reactor, separator, and coalescer.

Alkylation of low boiling paraffinic hydrocarbons, particularly isobutane and/or isopentane with alkylating reagents, particularly olefins such as ethylene, propylene, various butylenes, and/or various amylenes to form normally liquid paraffins having high octane numbers, using various catalyst systems is well known. Initially these processes were carried out in a system wherein the catalyst components and the reactants in a reactor were contacted under alkylation conditions, and a product-catalyst emulsion transferred to another vessel known as a separator where a phase separation was made between the lighter hydrocarbon product and the heavier catalyst phase. When aluminum halide catalysts were used an additional problem was encountered; small particles of the catalyst were entrained in the product and means had to be provided for these particles to coalesce so as to be separable; generally this coalescer comprised a separate vessel filled with appropriate packing material. Kilpatrick, U.S. 2,747,003 discloses an improvement method and apparatus for conducting alkylation and other hydrocarbon conversion processes, using either aluminum halide catalyst systems or other known catalysts such as hydrofluoric acid, sulfuric acid and the like, wherein intimate contact between and subsequent separation of, at least two substantially immiscible liquids is accomplished in a combined fluids mixing and separation apparatus.

It is an object of this invention to provide a combined reactor, separator, and coalescer.

It is a further object of this invention to provide for the separation of aluminum halide catalyst and liquid hydrocarbon within an alkylation vessel, and return of said separated catalyst to a catalyst phase without mixing with the hydrocarbon phase.

It is a still further object of this invention to provide phase separation of alkylate product and aluminum halide catalyst wherein the lighter alkylate product liquid phase is moved laterally across and above the heavier catalyst liquid phase so as to allow entrained catalyst to coalesce and separate out.

In accordance with this invention there is provided a process and apparatus wherein aluminum halide catalyst and hydrocarbon feed can be contacted under alkylation conditions in a reaction zone within an alkylation vessel, product and catalyst separated, the separated catalyst returned directly to a catalyst phase, and the alkylate product transferred laterally across the alkylation vessel to allow time for entrained catalyst therein to coalesce and to separate therefrom.

In the drawings forming a part hereof wherein like reference characters represent like parts in all views:

FIGURE 1 is a sectional view of an alkylation reactor with an unsectioned central core having a portion broken away; and FIGURE 2 is a cross section along line 2—2 of FIGURE 1.

Referring now to the drawings, there is shown an alkylation system comprising a generally vertically disposed alkylation vessel 2, which serves as the alkylation zone, having an upper portion designed to accommodate a vapor phase 5, an intermediate portion designed to accommodate a liquid hydrocarbon phase 30, and a lower portion designed to accommodate a catalyst phase 16. Within said vessel is a vertically disposed riser 4 having an upper set of apertures 6 in communication with vapor phase 5 and a lower set of apertures 8 in communication with said liquid hydrocarbon phase 30. Riser 4 has an open lower end 10 in communication with said catalyst phase.

Hydrocarbon feed from hydrocarbon feed line 12 is introduced into riser 4 via a feed introduction means such as sparger 14. The hydrocarbon feed, as it is propelled up riser 4, educts catalyst from the catalyst phase 16 through open lower end 10. Alkylation takes place within riser 4, this riser thus serving as the reaction zone. A mixture of alkylate product and catalyst is discharged from riser 4 through apertures 8, located at a level within said liquid hydrocarbon phase, onto tray 18. Tray 18 has a flat bottom 20 with a truncated end 22. Tray 18 is attached to wall 24 of vessel 2 around all of its circumference except along truncated end 22 which is attached to upwardly disposed dam or weir 26. The catalyst and alkylate product which has been deposited in the tray separate into two distinct portions, an upper hydrocarbon portion and a lower catalyst portion having an interface 27; in this way the tray and downcomers 28 serve as a separation zone. This lower catalyst portion flows through downcomers 28 directly into catalyst phase 16 in vessel 2. The downcomers terminate at about the interface 35 of the catalyst and liquid hydrocarbon phases. The upper hydrocarbon portion overflows weir 26 and is a part of the liquid hydrocarbon phase 30 in alkylation vessel 2. Extending downwardly from the truncated end 22 of tray 18, as a continuation of weir 26, is perforated baffle 32 which terminates at about the interface 35 of the catalyst and liquid hydrocarbon phases. Alkylate product including any liquid reactants, containing small particles of entrained catalyst migrates through perforated baffle 32 after overflowing from tray 18 and passes laterally across vessel 2 just above catalyst liquid phase 16 to product outlet 34. During this slow lateral travel across vessel 2 and around downcomers 28 the small particles of catalyst coalesce and settle out into the catalyst phase.

Thus the area between the bottom 20 of tray 18 and the interface 35 between the liquid hydrocarbon phase 30 and catalyst phase 16 serves as a quiescent coalescence zone. Unreacted vaporous material is removed from riser 4 via apertures 6, located at a level corresponding to vapor phase 5, and is drawn off from reaction 2 via vapor removal means in the form of line 36. This vaporous material passes through compressor 38, cooler 40, and fractionation column 42 wherein the feed components, for instance vaporous ethylene and liquid isobutane are separated and returned to feed line 12 via first and second recycle means in the form of lines 44 and 46, respectively. Vent 50 is provided to prevent build-up of inerts. Catalysts can be introduced into reaction vessel 2 via catalyst feed line 48.

The catalyst system can comprise any aluminum halide but is preferably aluminum chloride. Usually hydrogen chloride is added as an activator for this catalyst.

This invention is generally applicable to the alkylation of low boiling alkylatable paraffinic hydrocarbons such as isobutane and isopentane with alkylating reagents, particularly olefins such as ethylene, propylene, various butylenes, various amylenes, and mixtures thereof.

In a preferred embodiment this alkylation process and apparatus is employed to product diisopropyl (2,3-dimethylbutane) from a feed comprising isobutane and ethylene. In this preferred embodiment the ethylene will generally be introdduced into alkylation vessel 2 in the form of a vapor and the isobutane in the form of a liquid. Generally when diisopropyl is produced using aluminum chloride catalyst to alkylate isobutane with ethylene, a substantial amount of the feed does not react on any given pass. This unreacted feed in the form of a vapor (alkylation is exothermic and liquid isobutane, present in excess, is vaporized in part, to remove heat of reaction from the system) is withdrawn from the riser through the separate upper set of apertures; in this way the problem of carry-over of alkylate product and catalyst with the vapor is reduced. When operating in accordance with this preferred embodiment where a substantial amount of vapor is being removed it is essential to have two sets of apertures. If a substantial amount of vapor were not being pulled off, it would be possible to operate with only one set of apertures. It is apparent that the two sets of apertures do not have to have the configuration shown in the drawing; any type of port or ports for the removal of product, catalyst, and vapor can be used. Only a single aperture may be provided at each level, for instance, or the top of the riser may be open, and this open top can serve the function otherwise served by the upper set of apertures. Also the riser may flare outwardly above the upper set of apertures to further aid in preventing carry-over of liquid material entrained in the rising vapor.

It is apparent that if substantially all of the volatile feed components reacted completely on a single pass it would not be necessary to have the compressor cooler, and column to separate the feed components and return them to the reaction vessel; however when operating in accordance with the preferred embodiment these are essential.

Conventional control means such as in interface level controller can be used to control the level of catalyst in the alkylation vessel. In the preferred embodiment where a separate vapor phase is formed at the top of the alkylation vessel, conventional control means such as a liquid level controller can be used to regulate the withdrawal of alkylate product.

In the separation zone comprising the tray with an upstanding dam or weir and at least one downcomer, the interface between the distinct catalyst portion and the distinct hydrocarbon portion may be at a level within the tray or within the downcomers depending on the size and number of downcomers and the rates of flow. Smaller downcomers can be used if it is desired to have the level within the tray or at least high up in the downcomers, or larger downcomers can be used if it is desired to have the level lower down in the downcomers.

The reaction conditions such as the proportion of alkylatable hydrocarbon to alkylation reagent and to the aluminum halide catalyst, tempertaure, pressure and the like are well known in the art.

The unreacted isobutane taken off with the product is separated and recycled in a manner well known in the art.

EXAMPLE

Isobutane is alkylated with ethylene using an aluminum chloride complex catalyst in a system such as is shown in the drawings. Within the reaction zone (riser 4) the conditions are as follows: catalyst to hydrocarbon volume ratio, 1:1; contact time, 1 minute; pressure, 110 p.s.i.a.; temperature, 125° F.; and isobutane to ethylene weight ratio at the inlet of the reaction zone, 26:1. The temperature of the fresh feed in line 12 is 100° F. The flow rates in pounds per hour through lines 12, 34, and 36 are shown in Table I.

Table I

Fresh feed (12):
  Ethylene _____ 16,800
  Isobutane _____ 33,000
Product (34):
  Diisopropyl alkylate _____ 50,000
  Isobutane [a] _____ 340,000
Vapor recover for recycle (36):
  Ethylene _____ 1,300
  Isobutane _____ 98,000

[a] Recovered from alkylate and recycled.

While this invention has been described in detail for the purpose of illustration it is not to be construed as limited thereby but is intended to cover all changes and modifications within the spirit and scope thereof.

I claim:

1. In an improved alkylation process wherein an alkylation reactor is centrally located within a vertically disposed vessel and wherein a liquid hydrocarbon phase is separated from a first catalyst phase in an upper portion of said vessel, the improvement comprising:
  (1) passing said hydrocarbon phase to a lower level in said vessel below said separated catalyst;
  (2) maintaining said hydrocarbon at said level for a sufficient time interval for entrained catalyst to coalesce and settle out into a second catalyst phase at the bottom of said vessel;
  (3) passing said separated first catalyst phase directly from said upper portion of said vessel to said second catalyst phase; and
  (4) removing said hydrocarbon phase from said lower level of said vessel.

2. A process according to claim 1 wherein: said catalyst comprises aluminum chloride, a vapor phase is formed above said liquid hydrocarbon phase, vapor is removed from the top of said reactor and a hydrocarbon and catalyst mixture is withdrawn from said reactor and passed into said liquid hydrocarbon phase in said upper portion of said vessel.

3. A process according to claim 2 wherein: alkylatable hydrocarbon selected from the group consisting of isobutane, isopentane, and mixtures thereof is reacted with an alkylating reagent selected from the group consisting of ethylene, propylene, butylene, amylene, and mixtures thereof.

4. A process according to claim 2 wherein: isobutane is reacted with ethylene; and said product comprises diisopropyl.

5. A process according to claim 4 wherein: said vapor is compressed, condensed, and separated into component parts comprising vaporous ethylene and liquid isobutane; and said separated components are reintroduced into said reactor.

6. Alkylation apparatus comprising:
(1) a substantially vertically disposed alkylation vessel having a catalyst feed line at a lower portion thereof;
(2) a central, substantially vertically disposed riser having an open lower end and at least one aperture at the upper end;
(3) means located at the lower end of said riser for introducing feed;
(4) a tray extending across said vessel, said tray having an opening at one end thereof and having an upstanding weir along said opening, said tray being positioned just below said aperture;
(5) at least one downcomer communicating with said tray for direct transfer of separated catalyst from said tray to a catalyst phase in the lower portion of said alkylation vessel;
(6) a perforated baffle extending downwardly from said weir; and
(7) a product removal line in said reaction vessel at a point below said tray and above the lower end of said downcomer, said line being located on the opposite side of said vessel across from said perforated baffle.

7. Apparatus according to claim 6 wherein a first aperture and a second aperture are provided at different levels in said riser, the upper of said apertures serving to remove vapor from said riser and the lower aperture serving to remove liquid comprising catalyst and hydrocarbon product, said upper aperture positioned at a level so as to correspond with a vapor phase within said alkylation vessel and said lower aperture positioned at a level just above said tray and within said liquid hydrocarbon phase within said vessel, and wherein means are provided to remove said vapor from said vessel.

8. Apparatus according to claim 7 comprising in addition: a compressor, cooler, and separation column operably connected with each other and with said vapor removal means, for separating liquid and vapor feed elements from said removed vapors; and means to recycle said feed elements to said riser.

9. Apparatus according to claim 7 wherein said riser is flared out at the upper end thereof.

References Cited

UNITED STATES PATENTS

| | | | |
|---|---|---|---|
| 2,308,786 | 1/1943 | Smith | 23—285 |
| 3,249,649 | 5/1966 | Sherk et al. | 23—285 |
| 3,358,048 | 12/1967 | Sherk et al. | 260—683.53 |

DELBERT E. GANTZ, Primary Examiner

G. J. CRASANAKIS, Assistant Examiner

U.S. Cl. X.R.

23—288; 260—683.53